UNILATERALLY-TRANSMISSIVE FREQUENCY-SELECTIVE TRIODE CONVERTER

Filed Aug. 10, 1961

INVENTOR.
C. DALE NESTLERODE

BY

OSTROLENK, FABER, GERB & SOFFEN

ATTORNEYS

United States Patent Office 3,207,990

Patented Sept. 21, 1965

3,207,990
UNILATERALLY-TRANSMISSIVE FREQUENCY-SELECTIVE TRIODE CONVERTER

Clifford Dale Nestlerode, West Covina, Calif., assignor to Standard Kollsman Industries, Inc., Melrose Park, Ill., a corporation of Illinois Filed Aug. 10, 1961, Ser. No. 130,534
10 Claims. (Cl. 325—436)

This invention relates to radio systems, and is directed to selective tuning systems, particularly to a tuner, illustrated in its application to frequency-modulated systems, referred to herein, for convenience, as FM systems.

In radio systems, efficient radiation and transmission of an intelligence signal requires a carrier wave of relatively high frequency upon which the frequency or frequency band that characterizes the intelligence is superimposed or modulated. In the operation of reception of such modulated wave, the superimposed intelligence is removed by an inverse process of demodulation to derive the intelligence or information intitially imposed on the radiated carrier.

The demodulating operation usually utilizes the heterodyne principle by which voltage or current waves of two different frequencies are combined to establish, among others, a sum frequency and a difference frequency, either of which may then be selected for a desired purpose.

Since the high frequency carrier wave must be employed for the efficient radiation of the intelligence signal, but a lower carrier frequency modulated by the intelligence can be better operated on in a radio receiver, the heterodyne operation provides a simple way to lower the carrier frequency but retain the intelligence signal modulation of the original carrier wave at the point of reception, as in the receiver. For that purpose a local oscillator is employed to provide a frequency to be heterodyned with the incoming modulated carrier, in order to provide a lower difference frequency, generally referred to as the intermediate frequency, or IF, which can be more efficiently handled in the receiver.

The intermediate frequency, or IF, is usually much lower than the carrier frequency. The local oscillator frequency must also therefore be relatively high, differing from the carrier frequency by the small value of the IF. Since the oscillator frequency is so high, and since high frequency oscillations are easily radiated, it is necessary to provide suitable safeguards to confine such high frequency oscillations, of the local oscillators, to the circuit where their function is desired, and to prevent those oscillations from reaching other parts of the circuit which are inherently good radiators and which would therefore undesirably radiate such local oscillator frequency wave and cause undesirable interference effects on other receivers.

The problem of preventing such undesirable rediation of local high frequency oscillations is, from its very nature, ever present. Thus, an improvement in a related circuit may establish an ancillary problem to prevent such improvement from providing an outlet to the energy of the oscillations of the local oscillator.

The problem towards which the present invention is directed, arises in connection with an FM tuner which employs the heterodyne principle to shift the signal information from an incoming high radio frequency radiated carrier to a lower intermediate frequency local carrier within the receiver.

Two general arrangements are employed for the heterodyning operation. In one, the radio-frequency signal is amplified and fed to one grid of a multi-grid electron tube which receives the local oscillation signal on another grid. In this case the local oscillator utilizes a separate tube and circuit arrangement. Then, the multi-grid tube mixes the two input frequencies and produces, among others, the difference or intermediate frequency.

In another heterodyne arrangement, the radio frequency signal is amplified, as before, and fed to a grid of a multi-grid electron tube which is itself employed as part of the local oscillator. Here, also, several frequencies are produced, from which the desired difference frequency is selected for further amplification and ultimate signal information detection.

Where the local oscillator employs a separate tube, with related circuitry, a triode may be used. The electron tube used for combining the two frequencies, however, is generally a multi-grid tube, in order to provide isolation between the circuit of the radio-frequency amplifier and the circuit of the local oscillator, so the locally-generated high-frequency oscillations will not feed back into the radio-frequency amplifier circuit and thence into the antena, which is an efficient radiator.

A multi-grid tube is noisier, however, than a triode, because of the discontinuities in the electron stream path activity in the several parts of the electron stream path in the multi-grid tube, as distinguished from the continuous stream path activity in a triode.

One of the objects and a feature of this invention is to provide a turning and coupling system that will utilize and permit the use of a triode both for the oscillation generation and for the heterodyning operation, while preventing feed-back of the local frequency oscillations into the radio frequency amplifier circuit.

Another object of the invention is to provide a selective variable tuner circuit for tuning the receiver to a selected signal frequency and simultaneously varying the frequency of the local oscillator to track the frequency adjustment of the tuner, so the difference frequency between the incoming selected frequency and the locally generated oscillator frequency will be substantially uniform over the selective operating range of the receiver.

An interesting phenomenon in electronic circuitry is the possible existence of different resonance frequencies in adjacent meshes of electronic elements, even though the adjacent meshes may have one or more elements in common. That phenomenon is utilized in the present invention to establish an essentially unilateral frequency-selective tuner that will selectively transmit a selected signal frequency in a forward direction, from the radio frequency amplifier to the oscillator and mixing tube circuit, while, at the same time, blocking the oscillator frequency against transmission in a backward direction, from the oscillator circuit to the radio-frequency amplifier.

A further object of the invention, therefore, is to provide a unilaterally-transmissive frequency-selective tuner for transmitting a selected intelligence signal in a forward direction, while blocking feed-back transmission of a signal of a second frequency, such as, for example, the associated oscillator frequency.

Generally, the tuner herein consists of two tunable circuits in series, as a coupling between the radio frequency amplifier stage output and the oscillator mixer tube, with the first circuit tunable to the incoming signal carrier frequency for forward transmission of that carrier signal to the second circuit which includes the oscillator and the oscillator-mixer tube, the tuning adjustment of the first circuit causing an appropriate corresponding adjustment of the oscillator to establish a desired difference frequency between input carrier frequency and oscillator frequency to serve as the intermediate frequency to carry the signal intelligence, and the tuning of the first circuit establishing and maintaining an anti-resonant characteristic to block and prevent feed-back of the oscillator frequency to the radio-frequency amplifier stage.

The circuitry arrangement of the tuner and the manner in which it functions will be more fully explained in connection with the accompanying drawings, in which.

Figure 1:
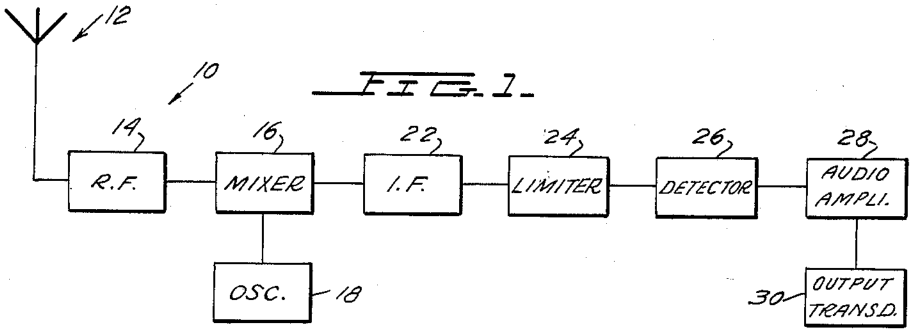
FIGURE 1 is a block diagram of a typical FM receiver.

As shown in FIGURE 1, a conventional FM receiver 10, shown energized from an antenna 12, generally comprises a high frequency or RF amplifier stage 14, a mixer or converter stage 16, fed from an oscillator 18, an intermediate-frequency or IF stage 22 fed from the mixer 16, a limiter stage 24, a frequency-demodulator or detector stage 26, an audio amplifier stage 28 and an output transducer 30.

Figure 2:
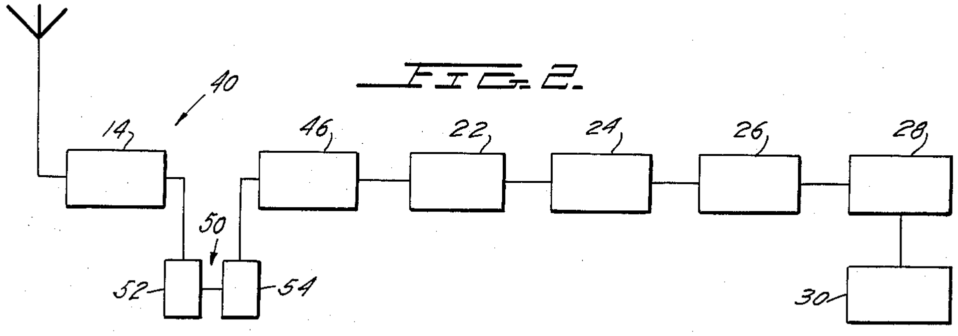
FIGURE 2 is a block diagram of the receiver of FIGURE 1, showing the location of the tuner of this invention.

FIGURE 2 shows a modified receiver 40 provided with a tuner 50, according to the present invention, including an RF tuning circuit 52 and an oscillator circuit 54, disposed between the RF amplifier stage 14 and the mixer-oscillator stage 46. The other components may be similar to those of FIGURE 1.

Figure 3:
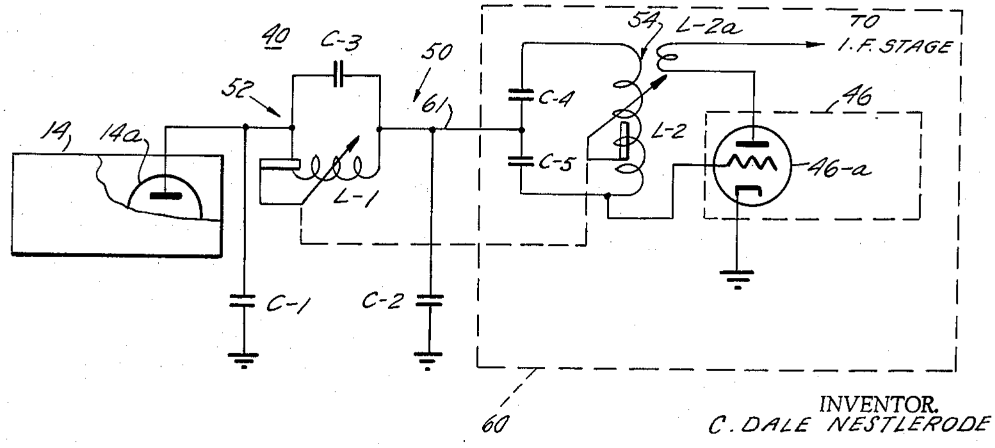
FIGURE 3 is a schematic circuit diagram of the tuner embodying the invention.

As shown schematically in FIGURE 3, the tuner 50 includes the RF tuning circuit 52 and the oscillator circuit 54, connected in series sequence to constitute the coupling between the output tube 14-*a* of the RF amplifier stage 14 and the mixer tube 46-*a* of the converter stage 46 of the oscillator circuit 54.

The function of the tuner 50 here is two-fold. First, the RF tuning circuit 52 is to be tuned to the selected incoming radio frequency, and, second, the oscillator circuit 54 is to be tuned to a frequency plus or minus that radio frequency, so the mixer tube output will contain a frequency corresponding to the difference between the radio frequency and the oscillator frequency, to constitute the intermediate frequency to carry the intelligence signal forward through the receiver.

The RF tuning circuit 52 and the oscillator circuit 54 are shown in schematic simplified form as including the basic elements, merely to illustrate the principles involved in the operation. Equivalent and additional auxiliary elements may be utilized within the framework of those principles.

Thus, the RF tuning circuit 52 includes a permeability-tunable coil L–1, two capacitors C–1 and C–2, which may be distributed capacities to ground or trimmer capacitors, and a capacitor C–3 that will cooperate with L–1 to establish an anti-resonant barrier to any feed-back from the oscillator, as will be shortly described. Adjustment of the tuning slug of L–1 tunes L–1 and capacitors C–1, C–2 and C–3 to the selected incoming frequency. The two tuning slugs of L–1 and of L–2 are mechanically coupled to permit simultaneous tuning of both coils.

The oscillator circuit 54 includes the permeability-tunable coil L–2 and two capacitors C–4 and C–5, to constitute the tank for the oscillator system, and a triode 46-*a* to serve as mixer tube, with a secondary coil L–2*a* to serve as a tickler coil to feed back energy to the main tank coil L–2 to keep the oscillator system going.

The use of the two capacitors C–4 and C–5 in the tank circuit with L–2, provides a relatively neutral point between them, in the tank circuit, at which the high-frequency signal carrier may be injected into the oscillator system with a minimum of interaction between the two circuits.

Adjustment of the tuning slug of coil L–2 tunes the tank circuit L–2, C–4 and C–5 to and for the oscillator frequencies, in connection with triode 46-*a*.

Coil L–2 is preferably similar to coil L–1 to simplify the tracking operation between them, during tuning at L–1. Thus, when L–1 is varied to select an incoming frequency, the oscillator frequency is simultaneously varied by L–2, so the difference between the incoming frequency and the oscillator frequency will be continuously relatively uniform. The computations to establish proper relationship between the two coils L–1 and L–2 and their associated capacitors, to maintain such difference frequency during tracking, are part of the known design art.

One of the novel features here is that L–2 and C–4 and C–5 are proportioned so they constitute the tank circuit tunable to the necessary oscillator frequencies by adjustment of L–2, while L–1 is being tuned to an incoming frequency, and at the same time, L–2 and C–4 constitute a series resonant circuit at the RF frequency being selected in the tuning circuit by coil L–1. Thus the selected RF signal frequency can pass readily through the path including L–1, C–4 and L–2, to the grid of oscillator tube 46*a* with substantially no impedance loss, since L–2 and C–4 are thus series resonant at that RF frequency and present minimum impedance at that frequency.

Another novel feature is that L–1 with C–1, C–2 and C–3 resonate at the selected RF frequency while L–1 and C–3 resonate at the oscillator frequency. Resonance of the entire assembly of components at the RF frequency permits transfer of the RF frequency signal to the oscillator circuit with minimum impedance loss.

At the same time, the resonance of L–1 and C–3 at the oscillator frequency establishes a parallel resonant or anti-resonant circuit, at oscillator frequency, in series with the signal path from plate 14*a* of the RF amplifier stage to the grid of mixer tube 46*a*. Such parallel or anti-resonant circuit presents a high impedance to the oscillator frequency and thereby blocks any signal voltage of oscillator frequency from feeding back from the oscillator circuit to the plate 14*a* of the RF amplifier stage.

Thus by simple arrangement of the tuning elements in the coupling circuit between the RF amplifier stage and the oscillator mixer stage, the tuning operation can be performed with confinement of the oscillator energy to its intended region of influence and blocked from entry into any efficient radiating zones.

As will be seen from FIGURE 3, the oscillator system may be shielded by a radiation shield 60, with only one through inlet terminal lead 61 needed for the connection to the neutral point of the oscillator tank. Such lead 61 can be extremely short, and its radiation effectiveness made practically nil.

Thus, by the arrangement shown, a simple tuner is provided, with no feed-back of oscillator energy, and with the use of a triode as the mixer, with minimum electronic noise introduced into the intermediate frequency signal.

A further feature of importance here is that this arrangement permits the use of a triode, with a resultant IF carrier that is quieter and less burdened with noise than is the case where multi-grid tubes are used, with consequent discontinuities in the electron stream path.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:

1. In a radio receiver, the combination with a radio tube of an RF amplifier stage and a triode tube of an oscillator mixer stage, of a coupling circuit between said tubes of the two stages, said coupling circuit comprising a first circuit tunable to the RF input signal frequency and simultaneously tunable to an oscillator frequency, and a second circuit tunable to a variable oscillator frequency that shall have a relatively fixed difference relation to the frequency of the input signal, thereby to provide a difference frequency output from the tube of the oscillator mixer stage, which output will have a relatively constant frequency to serve as an IF signal and said first R.F. tuned circuit having circuit means to block the oscillator frequency from feeding back to said R.F. amplifier stage.

2. A receiver as in claim 1, in which the first circuit means includes two elements in the coupling path of the R.F. amplifier said element characterized as being anti-resonant at the oscillator frequency, to serve as a barrier to prevent feed-back from the oscillator to the RF amplifier stage.

3. A receiver as in claim 1, in which the oscillator in the second circuit includes a tank having two elements series resonant to the selected input radio frequency to constitute a series path of minimum impedance to the signal at such radio frequency in passage to the oscillator mixer stage.

4. In a tuner an R.F. amplifier stage, an oscillator stage having a triode for use in a coupling circuit between the output of said RF amplifier stage and the input of the triode of said oscillator stage, said tuner including a first tunable mesh including means to tune the mesh to a selected radio frequency and including a parallel resonant circuit tuned to the frequency of said oscillator stage; a second tunable mesh including means to tune the mesh to an oscillator frequency; means coupling the two meshes in series connection to transmit a signal at any such selected radio frequency in a forward direction from the RF amplifier stage to the oscillator mixer stage.

5. A tuner, as in claim 4, comprising, further, means for mechanically coupling the two tuning means in said two meshes.

6. A tuner as in claim 4, in which the first mesh is tunable to a selected external incoming frequency over a predetermined range; and the second mesh is tunable to an internal oscillation frequency of a value bearing a fixed difference relationship to the incoming frequency; and said parallel resonant circuit constituting part of said first mesh and cooperating with said tuning means of said first mesh to establish an anti-resonant condition at the frequency of said second mesh in order thereby to prevent feed-back transmission of the local oscillator frequency energy through the first mesh and into an input circuit to the tuner.

7. A tuner comprising a first mesh containing adjustable means to tune the mesh to a selected incoming frequency; a second mesh including a triode and adjustable means to tune the mesh and triode to an oscillation frequency and including a series resonant circuit resonant to said selected incoming frequency; means coupling the two meshes in series relation to transmit the selected incoming frequency signal to and into the second mesh and the triode; and means coupling the adjustable means of the two meshes to relate the oscillation frequency in the second mesh to the selected incoming frequency.

8. A tuner comprising an input mesh including a coil, a series capacitor bridging the coil, parallel capacitors related to the coil, and a tuning slug to tune the coil and the capacitors to a selected incoming frequency; a local oscillator mesh turnable to the local oscillator frequency, said mesh including a coil, two capacitors in series with the coil to establish a neutral junction point between the two capacitors, a triode coupled to the coil in an oscillator circuit, and a tuning slug for the coil; means electrically coupling the output of the first mesh to the neutral point of the second mesh; and means mechanically coupling the two tuning slugs to track the two respective frequencies in the two meshes; the parameters of the coil and the series capacitor in the first mesh being such that said coil and capacitor will be anti-resonant to the oscillator frequency at the corresponding tuning condition of both coils, and the parameters of the coil and its parallel related capacitors in the coupling circuit being such as to be series resonant to the incoming frequency corresponding to the tuning condition of the coils.

9. In combination, an R.F. amplifier stage, an oscillator stage, a coupling between said R.F. stage and said oscillator stage, said coupling comprising a first and a second tunable circuit in series, said first circuit being tunable to the incoming signal carrier frequency for forward transmission of the carrier signal to the second circuit, said second circuit including an oscillator and oscillator-mixing triode, said first circuit including a circuit for tuning said first circuit to anti-resonate with respect to said oscillator frequency to prevent feed-back of the oscillator frequency to the radio frequency amplifier stage and said second circuit having a series resonant circuit resonating at the R.F. frequency of said R.F. stage.

10. A circuit in accordance with claim 9, in each of said tunable circuits, including an inductor and capacitors, the inductor of the first circuit and one of said capacitors being tuned to the R.F. frequency and the inductor and one of said capacitors forming a parallel resonance at the oscillator frequency for blocking said oscillator frequency from feeding back, and said second circuit including an inductor and capacitor for resonating at the oscillator frequency, and said last inductor and one of its capacitors forming a series resonant circuit at said R.F. frequency to form a low impedance path for the R.F. frequency to the oscillator stage.

References Cited by the Examiner

UNITED STATES PATENTS

| | | | |
|---|---|---|---|
| 2,543,067 | 2/51 | Sanders | 250—20.32 |
| 2,662,171 | 12/53 | Cock et al. | 250—20.32 |
| 2,808,505 | 10/57 | Cantz et al. | 250—20.32 |

DAVID G. REDINBAUGH, *Primary Examiner.*

ROY LAKE, STEPHEN W. CAPELLI, *Examiner.*